United States Patent
Piper et al.

(10) Patent No.: US 6,769,709 B1
(45) Date of Patent: Aug. 3, 2004

(54) TRAILER HITCH ALIGNMENT SYSTEM AND METHOD

(76) Inventors: Alan L. Piper, 8575 Union Hill Rd., Forney, TX (US) 75126-8236; Dean Alan Piper, 8575 Union Hill Rd., Forney, TX (US) 75126-8236

( * ) Notice: Subject to any disclaimer, the term of this patent is extended or adjusted under 35 U.S.C. 154(b) by 0 days.

(21) Appl. No.: 10/654,088

(22) Filed: Sep. 3, 2003

(51) Int. Cl.[7] .................................. B60D 1/36
(52) U.S. Cl. ....................... 280/477; 280/432
(58) Field of Search ................. 280/477, 432, 280/457, 458, 478.1

(56) References Cited

U.S. PATENT DOCUMENTS

| | | | |
|---|---|---|---|
| 3,418,628 A | * 12/1968 | Donaldson | 340/431 |
| 3,771,325 A | * 11/1973 | Sweeney et al. | 66/232 |
| 3,825,921 A | * 7/1974 | Marus et al. | 340/431 |
| 3,924,257 A | 12/1975 | Roberts | 340/282 |
| 3,938,122 A | 2/1976 | Mangus | 340/275 |
| 3,945,668 A | 3/1976 | Holland | 280/423 R |
| 4,054,302 A | 10/1977 | Campbell | 280/477 |
| 4,103,793 A | 8/1978 | Weaver | 214/506 |
| 4,187,494 A | 2/1980 | Jessee | 340/52 R |
| 4,199,756 A | * 4/1980 | Dito | 340/431 |
| 4,283,073 A | 8/1981 | Gostomski et al. | 280/508 |
| 4,938,495 A | * 7/1990 | Beasley et al. | 280/477 |
| 4,952,908 A | 8/1990 | Sanner | 340/429 |
| 5,108,123 A | 4/1992 | Rubenzik | 280/477 |
| 5,191,328 A | 3/1993 | Nelson | 340/870.06 |
| 5,558,352 A | 9/1996 | Mills | 280/477 |
| 5,650,764 A | 7/1997 | McCullough | 340/431 |
| 5,729,194 A | * 3/1998 | Spears et al. | 340/431 |
| 5,861,814 A | 1/1999 | Clayton | 340/687 |
| 5,905,433 A | 5/1999 | Wortham | 340/431 |
| 5,951,035 A | 9/1999 | Phillips, Jr. et al. | 280/477 |
| 5,970,619 A | 10/1999 | Wells | 33/264 |
| 6,089,590 A | * 7/2000 | Bowers | 280/477 |
| 6,100,795 A | 8/2000 | Otterbacher et al. | 340/431 |
| 6,178,650 B1 | 1/2001 | Thibodeaux | 33/286 |
| 6,179,318 B1 | 1/2001 | Howard | 280/477 |
| 6,239,926 B1 | 5/2001 | De Shazer | 359/841 |
| 6,259,357 B1 | * 7/2001 | Heider | 340/431 |
| 6,341,794 B1 | 1/2002 | Hunter | 280/477 |
| 6,357,126 B1 | 3/2002 | Gillen, Jr. | 33/264 |
| 6,480,104 B1 | 11/2002 | Wall et al. | 340/431 |
| 6,499,851 B1 | 12/2002 | Kelly et al. | 359/850 |
| 6,540,247 B1 | 4/2003 | Perkins | 280/477 |
| 2002/0174356 A1 | 11/2002 | Padole et al. | 713/200 |
| 2003/0051654 A1 | * 3/2003 | Jarosek et al. | 116/28 R |
| 2003/0234512 A1 | * 12/2003 | Holub | 280/432 |

FOREIGN PATENT DOCUMENTS

GB 2 161 769 * 1/1986 ............ B60D/1/06

* cited by examiner

*Primary Examiner*—Avraham Lerner
(74) *Attorney, Agent, or Firm*—Kenneth L. Nash

(57) ABSTRACT

A trailer hitch alignment system provides a system that can be utilized with different trailers without requiring modification of the trailers or requiring minor modifications that require less than a minute or so to effect. In a preferred embodiment, the present invention provides two acoustic transceivers for directing acoustic signals towards and receiving reflected acoustic signals from a downwardly extending hitch assembly for a gooseneck trailer whereby this unique feature of the gooseneck trailer is utilized as a signal reflector. A timer is utilized to time the transmitted/reflected signals to determine at least two distances for determining a relative position of the downwardly extending hitch. A readout gives the driver ongoing feedback for aligning the gooseneck downwardly extending hitch with the hitch ball.

8 Claims, 3 Drawing Sheets

TRAILER HITCH ALIGNMENT SYSTEM AND METHOD

TECHNICAL FIELD

The present invention relates generally to trailer/vehicle alignment systems and, more particularly, to an alignment system that may be utilized with gooseneck trailers with little or no modification to the trailers.

BACKGROUND ART

Connecting a gooseneck trailer to a pickup with a quad cab can be quite time consuming and difficult because the location of the hitch cannot be readily seen. The problem of alignment for a gooseneck trailer is perhaps enhanced because the trailer has to be aligned accurately before lowering the hitch connection to the ball joint. As discussed below, the basic problem of making connections to a trailer has been recognized in the past and many attempts have been made to solve the problem. However, for the most part, the trailer hitch alignment systems found in the prior art require significant modification of the trailer. Thus, if it is desired to utilize the alignment system with different trailers, it may be necessary to make numerous modifications and perhaps extensive recalibrations for each trailer. Thus, the prior art devices and methods have numerous drawbacks related to requiring time-consuming installation of the system in a particular trailer as well as the problem of operation if a different trailer is used. Patents related to such attempts include the following:

U.S. Pat. No. 6,178,650, issued Jan. 30, 2001, to J. Thibodeaux, purportedly discloses a trailer hitch positioning system that provides a visual and an audible indication to a vehicle driver of the position of the trailer ball with respect to the tongue of the trailer. The trailer hitch positioning system includes a pinpoint light source assembly, a light beam sensing array assembly, and a passenger compartment display unit wherein a pinpoint beam from the pinpoint light source assembly strikes and activates light beam sensors within the light beam sensing array assembly, the activations of the light beam sensors being detected by a digital controller within the display unit which then provides a corresponding positional information output to the vehicle driver through a LED display and an audible alerting buzzer.

U.S. Pat. No. 6,100,795, issued Aug. 8, 2000, to Otterbacher et al., purportedly discloses a trailer hitch alignment system which allows a user to align a hitch of a vehicle with a trailer hitch. The inventive device includes a control that is mountable to a visor of the vehicle in view of the driver, a receiver unit attachable to the bumper of the vehicle and in communication with the control unit, a transmitter unit removably attachable to a trailer hitch that transmits a locating signal that is detectable by the receiver unit, and a storage case. Electronic circuitry within the control unit determines the position of the transmitter unit from the receiver unit from the reception of the locating signal. The control unit includes a turn right indicator and a turn left indicator for visually indicating to the user whether to turn left or right while backing toward the conventional trailer. The control unit also includes a buzzer and stop indicator light for indicating to the user when the ball hitch is positioned below the coupler of the trailer hitch. The control unit also includes a display screen that visually indicates the position of the vehicle with respect to the trailer hitch. If the user needs to turn left or right, either the turn left indicator or the turn right indicator will display various levels of lights indicating to the user that they must turn appropriately for proper alignment of the vehicle with the conventional trailer.

U.S. Pat. No. 6,480,104, issued Nov. 12, 2002, to Wall et al., purportedly discloses a trailer alignment device for backing a tow-vehicle to a trailer. The device utilizes a number of ultrasonic transducers to gauge the location of the tow-vehicle to the trailer. This information is transmitted to a control unit that analyzes such data and creates a visual display for the operator to use in backing the tow-vehicle to the trailer.

U.S. Pat. No. 3,938,122, issued Feb. 10, 1976, to Jack E. Mangus, purportedly discloses a guidance device for the alignment of two separate objects at least one of which is movable with respect to the other such as, towing and towed vehicles, boats with a dock or trucks with loading docks. The device includes a flexible line connectable between desired points on the objects, such as the trailer hitch and the draw bar of the trailer, and means mounted on one of the objects for drawing in the line as the first object moves toward the second. A sensing means detects changes in the alignment of the two objects and an indicating means signals the changes to the operator whereby alignment may be determined and maintained. Additional indicating means may be provided to enable the operator to check the operability of various electrical components on board the vehicles.

U.S. Pat. No. 4,187,494, issued Feb. 5, 1980, to J. W. Jessee, purportedly discloses a device to facilitate the positioning of a towing vehicle with respect to a towed vehicle whereby hitch components on the vehicles are properly positioned for articulately connecting the vehicles. The device includes a flexible tension member having one end connected with a spring wound reel on one of the vehicles and the other end connected with the other of the vehicles. A sensing device is associated with the tension member and the vehicles to indicate to the operator of the towing vehicle the manner in which the towing vehicle should be maneuvered to properly position the hitch components. The sensing means is actuated in response to angular and linear disposition of the flexible tension member which actuates a signal generating means which produces distinguishable audible and visual signals.

U.S. Pat. No. 4,952,908, issued Aug. 28, 1990, to J. A. Senner, purportedly discloses a trailer stability monitor for tractor-trailer vehicles including a motion sensor and signal responsive r.f. transmitter responsive thereto mounted on the trailer and a r.f. signal receiver coupled to alarm means and mounted on the tractor, preferably in the cab thereof, for receiving the signal from the transmitter and causing an alarm to warn the operator of the tractor-trailer of conditions conducive to rollover to permit remedial measures to be undertaken to avoid such incident. The motion sensor includes a pair of angular mounted normally open mercury switches arranged to detect lateral forces to the right or left to a degree conducive to rollover. A vertically oriented normally closed mercury inertia switch is connected in series with the pair of angular mounted parallel connected switches to momentarily disable the circuit to prevent spurious signals from bumps. The switch array is connected in series with a battery and a lower power r.f. oscillator transmitter which transmits a coded low power signal when the switch array is closed. The receiver/alarm includes a r.f. receiver which can detect the signal from the transmitter and activate an alarm of sufficient power to alert the operator. The signal can be transmitted air to air via an antenna or by superimposing the signal on a pair of the existing electrical lines of the tractor-trailer, using the lines as a r.f. line carrier.

U.S. Pat. No. 5,970,619, issued Oct. 26, 1999, to R. L. Wells, purportedly discloses a device for guiding alignment of a trailer hitch with a trailer cup attachment and a towing vehicle attachment. The trailer cup attachment adjustably clips over the trailer cup on the draw bar of the trailer. The trailer cup attachment has at least one vertical rod and an alignment indicator equipped with guide lights and a sound generator to indicate when the ball on the towing vehicle is in hitching position relative to the trailer cup. The towing vehicle attachment has a mounting base for removable temporary mounting on the towing vehicle. Telescoping rods are rotatably mounted in the mounting base. At the end of the telescoping rods is a fluorescent colored activating ball which is positioned directly above the tow ball on the towing vehicle. The alignment guide and activating ball are positioned to be visible to the operator of the towing vehicle through a rear view mirror, rear window, or the like. As the towing vehicle backs toward the trailer, the activating ball and alignment guide provide immediate visual feedback to the operator of the towing vehicle, so that angle and speed of the backing vehicle may be accordingly adjusted. When the activating ball touches the alignment guide, a red light comes on and a sound is generated. This tells the operator of the towing vehicle that the tow ball is in hitching position relative to the trailer cup. The operator may then leave the vehicle and complete the hitching process.

U.S. Pat. No. 5,905,433, issued May 18, 1999, to L. C. Wortham, purportedly discloses a trailer communications system. The system includes a trailer transducer unit for location on a trailer. A vehicle transducer unit can be located on a vehicle or a stationary object. The trailer transducer unit and the vehicle transducer unit may communicate information in the form of acoustic signals broadcast at an ultrasonic frequency in response to a predetermined event.

U.S. Pat. No. 5,861,814, issued Jan. 19, 1999, to M. Clayton, purportedly discloses a trailer hitch with sensor system for allowing alignment for coupling with a trailer. The inventive device includes a hitch portion secured to a rear portion of a towing vehicle. The hitch portion has an upper ball portion. The upper ball portion has a pair of sensors disposed therein. Each of the sensors is connected to a central wire. The central wire extends interiorly of the vehicle. A trailer tongue extends outwardly from a trailer. The trailer tongue has a ball socket formed within a free end thereof. The ball socket is dimensioned for receiving the upper ball portion of the hitch portion therein. The ball socket has a magnet disposed therein for being sensed by the sensors of the upper ball portion. A display box is positioned interiorly of the vehicle. The display box is in communication with the central wire of the pair of sensors. The display box provides signals related to a proximity of the trailer tongue to the hitch portion.

U.S. Pat. No. 5,650,764, issued Jul. 22, 1996, to D. McCullough, purportedly discloses a visual aid for assisting a driver backing up a towing vehicle to a drawn vehicle. A visual display includes a flat screen upon which are depicted images in the form of silhouettes or like simulations of the respective vehicles. This effect is provided by partially and selectively illuminating the screen. A sensor is placed on at least one of the vehicles for detecting relative alignment therebetween and proximity thereof. The sensor generates a signal which controls the screen. The silhouettes are moved on the screen in proportion to the actual relationship of the two vehicles. In a preferred embodiment, the image of the towing vehicle is stationary, and the image of the drawn vehicle moves responsively to input from the sensor. The sensor may employ an emitting coil and an induction coil, or may be of the reflected energy type, such as radar and infrared radiation. The display control preferably comprises a microprocessor. The visual aid has an on-off switch, a proximity readout, and an alarm annunciating the presence of an object interposed between the tow vehicle and the draft vehicle.

U.S. Pat. No. 5,191,328, issued Mar. 2, 1993, to T. L. Nelson, purportedly discloses a trailer hitching aid includes a dual transmitter mounted on the forward end of a trailer or other vehicle to be towed and arranged to transmit pulses of infrared light and pulses of ultrasonic sound. A towing vehicle mounts on its rear end an infrared light detector and a pair of laterally spaced ultrasonic sound detectors. The detectors are incorporated in an electrical circuit which includes a computer the program of which operates to measure the time difference between the detection of a light burst and the detection of sound bursts. The time differences then are utilized to calculate the distance from each detector to the transmitter, and the distances and angles between the detectors and transmitter are displayed on the computer screen as visual indications to direct the operator of the towing vehicle to maneuver the vehicle to back it up and bring the hitch components on the vehicles into coupling registry.

The above cited prior art does not provide a means for aligning a gooseneck trailer with a hitch wherein minor or no changes to the trailer are required. There has been a long felt but unsolved need to provide improved and easily trailer coupling while minimizing or eliminating modifications required for the trailer. Those of skill in the art will greatly appreciate the present invention which addresses the above problems and other problems.

SUMMARY OF THE INVENTION

Accordingly, it is an objective of the present invention to provide an improved trailer/vehicle alignment system and method.

Another objective is to provide a trailer/vehicle alignment system and method that requires only minor or no modifications to the trailer.

These and other objectives, features, and advantages of the present invention will become apparent from the drawings, the descriptions given herein, and the appended claims. However, it will be understood that any listed objective and/or other objectives, features, and advantages of the invention are provided only as an aid in understanding aspects of the invention, and are not intended to limit the invention in any way, and therefore do not form a comprehensive or restrictive list of objectives, and/or features, and/or advantages of the invention.

Accordingly, the present invention provides a trailer hitch alignment system for aligning a vehicle with a gooseneck trailer, wherein the gooseneck trailer has a downwardly extending hitch assembly for mating with a hitch ball mounted to the vehicle. The vehicle may typically comprise a cab, a truck bed, and a bed box. The system may comprise one or more elements such as, for instance, one or more transmitters mounted to the vehicle on an inner portion of the bed box at one or more known positions for transmitting energy toward the downwardly extending hitch assembly and/or a first receiver mounted to the vehicle on an inner portion of the bed box in a known position for receiving a first reflected energy signal from the downwardly extending hitch assembly and/or a second receiver mounted to the vehicle on an inner portion of the bed box in a known position for receiving a second reflected energy signal from downwardly extending hitch assembly. Other elements may comprise a timer for determining a time of travel of the energy from the one or more transmitters to the downwardly extending hitch assembly and to the first receiver and the second receiver and/or a processor connected to the timer for determining a relative position of the downwardly extending hitch assembly with respect to a position of the hitch ball from the time of travel. An indicator indicates the relative position of the downwardly extending hitch assembly with respect to a position of the hitch ball.

In one embodiment, the gooseneck trailer(s) is unmodified for use with the system. Thus, the system may be used for different gooseneck trailers. In another embodiment, the system may further comprise a passive energy signal reflector mounted to the downwardly extending hitch assembly. In this case, the passive energy signal reflector may be of a type which passively modifies or modulates the energy applied thereto to thereby produce an identifiable, modified, and/or modulated reflection which may be utilized with a matching receiver sensitive to the particular modification or modulation to thereby increase signal detection in noisy environment.

The one or more transmitters and the first receiver and the second receiver may preferably comprise a first transceiver and a second transceiver and may comprise acoustic transceivers. The first transceiver and the second transceiver may preferably be mounted to an upper portion of the bed box.

The timer and the processor comprise a microprocessor which is programmable so as to be operative for determining the relative position of the downwardly extending hitch assembly with respect to a position of the hitch ball.

The present invention also comprises a method with one or more steps such as, for instance, transmitting one or more acoustic signals in a direction of the downwardly extending hitch assembly, and/or receiving a first reflected signal from the downwardly extending hitch assembly, and/or receiving a second reflected signal from the downwardly extending hitch assembly. Other steps may comprise determining a relative position between the downwardly extending hitch assembly and the hitch ball within the bed box from the steps of receiving the first reflected signal and the second reflected signal. The method may further comprise monitoring changes in the relative position between the downwardly extending hitch assembly and the hitch ball within the bed box while adjusting a relative position of the vehicle with respect to the gooseneck trailer to thereby align the downwardly extending hitch assembly with the hitch ball within the bed box.

The method may further comprise mounting a first acoustic transceiver and a second acoustic transceiver within the bed box at an upper portion thereof and/or utilizing a surface of the downwardly extending hitch assembly to produce the first reflected signal and the second reflected signal.

In one embodiment, the method may further comprise utilizing the surface without modifying the surface. In another embodiment, the method may further comprise mounting an acoustic signal reflector to the downwardly extending hitch.

The step of determining a relative position between the downwardly extending hitch assembly and the hitch ball within the bed box from the steps of receiving the first reflected signal and the second reflected signal may further comprise programming a processor.

In another embodiment, a method for aligning a vehicle with a trailer is provided which may comprise steps such as transmitting one or more signals in a direction of the downwardly extending hitch assembly, passively reflecting a first reflected signal from the target element to a first receiver, passively reflecting a second reflected signal from the target element to a second receiver, utilizing a timer to determine a relative position between the target element and the hitch ball from the first reflected signal and the second reflected signal, and/or monitoring changes in the relative position between the target element and the hitch ball while adjusting a relative position of the vehicle with respect to the gooseneck trailer to thereby align the target element with the hitch ball.

BRIEF DESCRIPTION OF DRAWINGS

For a further understanding of the nature and objects of the present invention, reference should be had to the following detailed description, taken in conjunction with the accompanying drawings, in which like elements may be given the same or analogous reference numbers and wherein.

While the present invention will be described in connection with presently preferred embodiments, it will be understood that it is not intended to limit the invention to those embodiments. On the contrary, it is intended to cover all alternatives, modifications, and equivalents included within the spirit of the invention.

GENERAL DESCRIPTION AND PREFERRED MODES FOR CARRYING OUT THE INVENTION

The present invention provides a novel approach to aligning a trailer hitch to a vehicle and is especially useful with gooseneck trailers. However, other types of vehicles and trailers could utilize the present invention. One advantage of the present invention is the ability to easily utilize different trailers with the vehicle.

Figure 1:
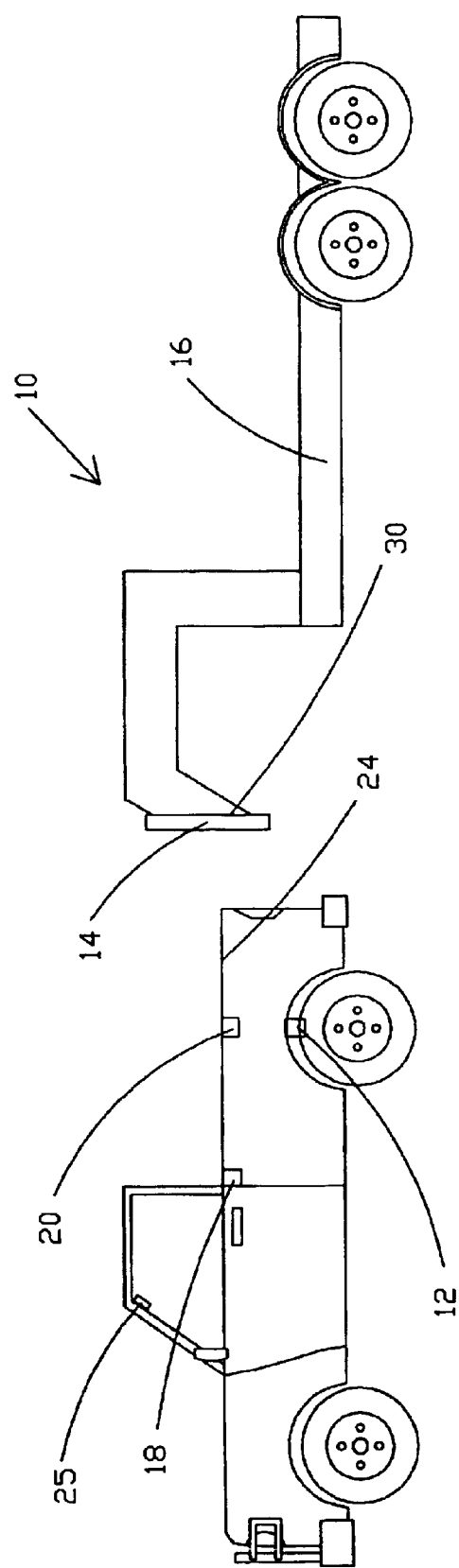
FIG. 1 is a side elevational view, partially in hidden lines, of a trailer hitch alignment system in accord with one possible embodiment of the present invention.
Figure 2:
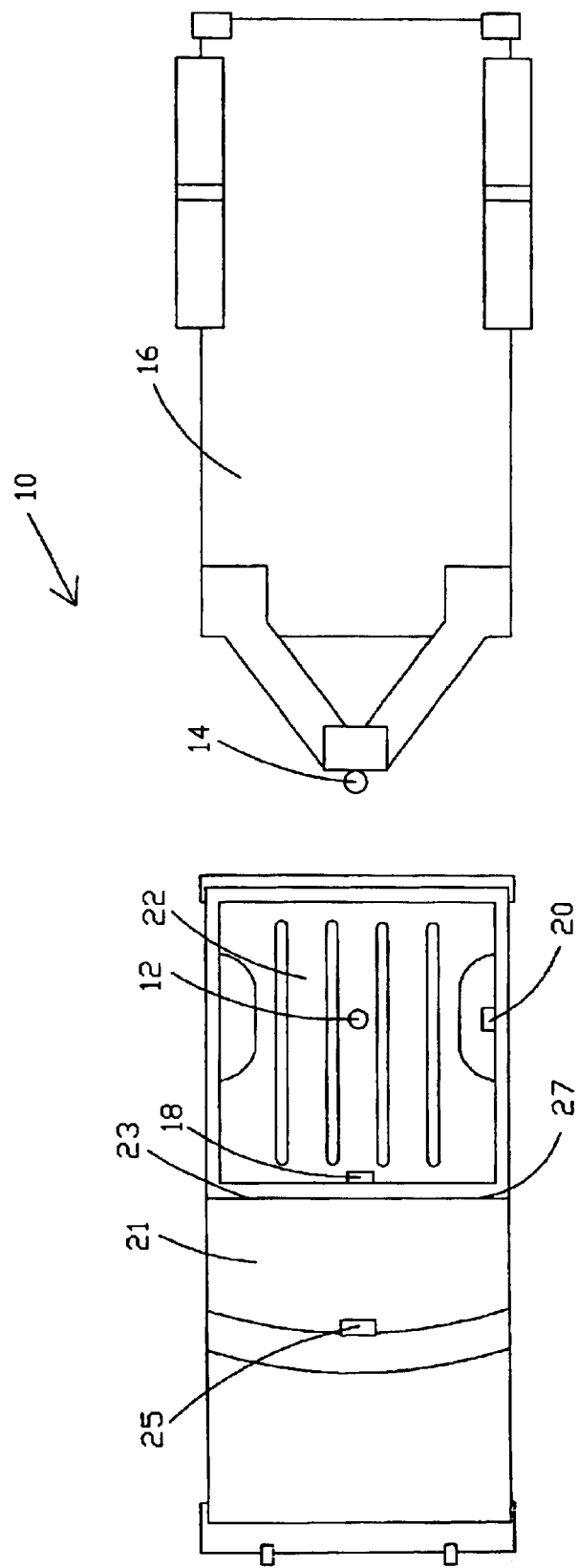
FIG. 2 is a top elevational view with respect to the view of FIG. 1 for a trailer hitch alignment system in accord with one possible embodiment the present invention.

Now referring to the drawings, and more particularly to FIG. 1–FIG. 2, there is shown an embodiment of system 10 which provides for an electronic system to provide alignment information to the driver for exact positioning of hitch ball 12 and with respect to target pipe 14 of gooseneck trailer 16. Target pipe 14 comprises the downwardly extending hitch assembly that connects to hitch ball 12 which is typically positioned in the center of the truck bed.

A preferred embodiment of the invention utilizes transceivers 18 and 20 mounted in or adjacent truck bed 22 (see FIG. 2) at known locations therein. While various types of transceivers may be utilized, in one preferred embodiment a pair of acoustic transceivers are utilized at known locations. Each transceiver may comprise a sonic speaker and a microphone. A preferred embodiment utilizes an acoustic pulse transmission, whereby a microcontroller waits a set amount of time after each acoustic pulse transmission to detect a reflection. Separate acoustic transmitters and receivers may also be utilized. If separate transmitter/receivers are used and are positioned separately, then continuous acoustic transmission signals rather than pulse signals may be more suitable. While a preferred embodiment utilizes only two transceivers, additional transceivers could also be utilized if desired. It would also be possible to utilize a single transmitter with at least two receivers. Moreover, other types of transceivers such as optic or electromagnetic transducers could also be utilized with the purpose of the transceiver being to determine a distance from the transceiver also pipe 14 as discussed hereinafter in connection with FIG. 3.

Transceivers 18 and 20 could be positioned anywhere in truck bed 22. So long as their position is known, then the programming of system 10 can determine the relative position of pipe 14 with respect to hitch ball 12. However, in one preferred embodiment, transceiver 18 is conveniently positioned on the rear of truck cab 21 directly in front of hitch ball 12. Transceiver 20 is conveniently positioned directly to one side or the other of hitch ball 20 on an internal wall of the pickup bed above the wheel well. Transceivers 18 and 20 are preferably positioned at the same height above truck bed 22 and preferably at or near the top of bed box 24. By positioning transceivers 18 and 20 at the top of the bed box, the signal is readily seen when target pipe 14 enters bed box 24 or comes close thereto. In some cases, the truck may not have box 24 (such as a flatbed truck) whereupon a suitable position for transceivers 18 and 20 might be at a position above bed 22 such as at the positions indicated by numerals 23 or 27 (see FIG. 2). If desired, the transceivers could also be positioned on bed 22 as desired especially when used with noise reduction techniques as discussed hereinafter.

The two acoustic transceivers transmit an acoustic signal, which may be a pulsed acoustic signal. For a gooseneck trailer, target pipe 14 tends to be quite large and provides a distinct target. Target pipe 14 reflects the acoustic pulse back to acoustic transceivers 18 and 20. The time of travel between transmission and receipt of the acoustic pulse is measured by a timer, such as a timer in a microprocessor or the like which may be located as desired and may be included as part of a package for readout 25, or transceivers 18 or 20, or located elsewhere. The timer provides a time of travel from which the distance of target pipe 14 from each of acoustic transceivers 18 and 20, whose position is known, is readily calculated.

Figure 3:
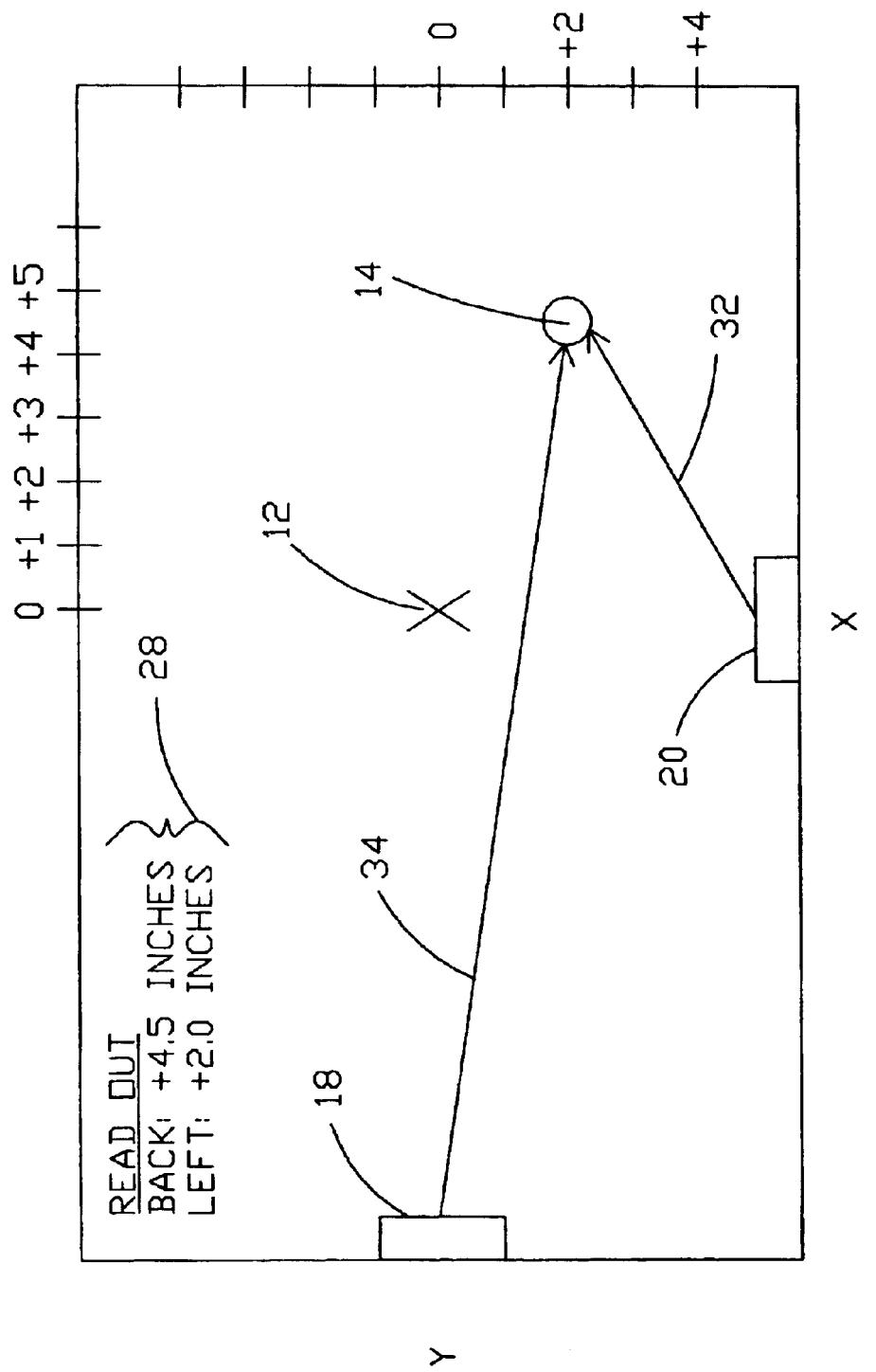
FIG. 3 is a system graph illustrating operation and programming of one possible embodiment of the present invention.

By knowing the position of acoustic transceivers 18 and 20, and the position of hitch ball 18, software can be utilized to provide an X-Y plot as shown in FIG. 3 that gives the relative position of target pipe 14 with respect to hitch ball 18. For the sake of simplicity, a two dimensional X-Y plot is preferred but a three dimensional plot, preferably utilizing three transducers could also be utilized, if desired. The location of target pipe 14 is displayed at driver display 25 which is preferably conveniently mounted at any desired position within vehicle cab 21. Display 25 may simply be a LCD readout as indicated at 28 in FIG. 3 but could also provide a visual picture showing the relative position of hitch ball 12 and target pipe 14, if desired. Display 25 may also comprise a digitally spoken output such as backing directions or the like.

The unique configuration of the gooseneck trailer target pipe 14 results in a system which can detect target pipe 14 readily. Therefore, the present system can be utilized on different gooseneck trailers without any need for modification of any particular gooseneck trailer.

If desired, various embodiments of the system may be utilized to further enhance detection of target pipe 14. While not normally necessary, the enhancements may be useful due to clutter, such as upright objects in pickup bed 22, which may extend into the plane of detection, and/or rain, and the like. As an example, in one embodiment, the system may utilize a nulling system whereby prior to backing up the pickup, the background system signals are nulled. After nulling, the system detects only a significant change from the nulled background system to thereby avoid false signals due to clutter and the like. This technique may help avoid problems with carrying other objects in the pickup bed, including upright objects, and the like, which may change from day to day. In another embodiment, the transmitter signal may be directed by a directional member and aimed in a specific direction away from bed 22 to thereby reduce background noise of the type discussed above.

In another embodiment similar to the one above, system 10 may be tuned to detect moving objects as compared to purely static ones. Thus, the programming may wait until a moving target is detected, such as when target pipe 14 moves into range during backing up of the pickup. Once movement is detected, the programming latches onto it by restricting new reception solutions to previous ones which were closely adjacent thereto for more consistent tracking.

In another embodiment, system 10 may be tuned to detect the particular reflected energy features or signature produced by reflecting an acoustic signal or other type of signal from target pipe 14. The unique structure of target pipe 14 is fairly consistent for all gooseneck trailers (hence the name gooseneck) and therefore lends itself to detection of the unique characteristics thereof. Thus, the detector may be especially designed to detect reflections from target pipe 14.

In yet another embodiment, a small passive stick-on transponders 30 may be utilized to enable use of the present invention with any type of trailer. Various types of passive signal reflectors are commercially available for detection of objects such as to prevent shoplifting or to provide a tag for a vehicle passing through a gate. In many cases, the transponders are quite inexpensive, and may comprise a coiled antenna or other reflector printed onto a substrate which may be flexible. The passive reflector reflects energy directed toward it by a transmitter, such as acoustic or electromagnetic energy, in a particular signature manner that is readily detected by a special receiver attuned to reception thereof. Such transponders may be attached by glue, by a pipe clamp, elastic band, or the like, in less than a minute, to the desired target, e.g., target pipe 14. In this case, only minor modifications are required to detect any type of trailer hitch although the passive reflector or transponder may also be utilized for gooseneck trailers as another means to avoid any false signals due to clutter or the like. Thus, this embodiment still provides the ability to use different trailers with the system with only a quick (less than a minute), and inexpensive, modification to the new trailer. Moreover, this embodiment permits the invention to be utilized with any type of trailer.

FIG. 3 provides a basic picture of operation of the system. Transceiver 20 sends out an acoustic signal, such as a pulse, and then waits to receive a reflection. By measuring the time durations related to when the reflection is received, distance 32 to target pipe 14 can be determined. Likewise, distance 34 from transceiver 18 is determined. Knowing these two distances, and assuming an x-y plane of detection (at a height of about the top of the bed box where the transceivers are preferably positioned), then the position of target pipe 14 with respect to hitch ball 12 is readily determined by the software calculations.

In operation, it may be desirable to initially position target pipe 14 over hitch ball 12 to verify the calibration of the system and to verify that the system has memorized the relative position of hitch ball 12. After that, any movement of target pipe 14 will indicate the relative position. For instance, if the truck is moved forward one foot after this calibration, then a LCD readout would say back +12 inches. Thus, it is relatively easy for the driver to align target 14 with hitch ball 12. If the user is not exactly sure of the relative positions of transceivers 18 and 20, or the accuracy of the position at which they are mounted, then a two-step calibration can be made using hitch ball 12 as the first calibration point. A second calibration point can be determined by measuring to a position from hitch ball 12 and entering this into system 10.

The foregoing disclosure and description of the invention is therefore illustrative and explanatory of a presently preferred embodiment of the invention and variations thereof, and it will be appreciated by those skilled in the art, that various changes in the design, manufacture, layout, organization, order of operation, means of operation, equipment structures and location, methodology, the use of mechanical equivalents, as well as in the details of the illustrated construction or combinations of features of the various elements may be made without departing from the spirit of the invention. For instance, processors, computers, microprocessors and the like may be interchangeably utilized in accord with the present invention to perform calculations. However, the present invention may be programmed for operation via software but could also be hardwired for operation and/or may be partially programmed and partially hardwired. The drawings are intended to describe the concepts of the invention so that the presently preferred embodiments of the invention will be plainly disclosed to one of skill in the art but are not intended to be manufacturing level drawings or renditions of final products and may include simplified conceptual views. Thus, various changes and alternatives may be utilized that remain within the spirit of the invention. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative of a presently preferred embodiment and not in a limiting sense.

What is claimed is:

1. A trailer hitch alignment system for aligning a vehicle with a gooseneck trailer, said gooseneck trailer having a downwardly extending hitch assembly for mating with a hitch ball mounted to said vehicle, said vehicle comprising a cab, a truck bed, and a bed box, said system comprising:

one or more transmitters mounted to said vehicle on an inner portion of said bed box at one or more known positions for transmitting energy toward said downwardly extending hitch assembly;

a first receiver mounted to said vehicle on an inner portion of said bed box in a known position for receiving a first reflected energy signal from said downwardly extending hitch assembly;

a second receiver mounted to said vehicle on an inner portion of said bed box in a known position for receiving a second reflected energy signal from downwardly extending hitch assembly;

a timer for determining a time of travel of said energy from said one or more transmitters to said downwardly extending hitch assembly and to said first receiver and said second receiver;

a processor connected to said timer for determining a relative position of said downwardly extending hitch assembly with respect to a position of said hitch ball from said time of travel; and an indicator for indicating said relative position of said downwardly extending hitch assembly with respect to a position of said hitch ball.

2. The system of claim 1, wherein said gooseneck trailer is unmodified for use with said system.

3. The system of claim 1, further comprising a passive energy signal reflector mounted to said downwardly extending hitch assembly.

4. The system of claim 1, wherein said passive energy signal reflector is of a type which passively modulates said energy applied thereto to thereby produce an identifiable reflection.

5. The system of claim 1, wherein one or more transmitters and said first receiver and said second receiver comprise a first transceiver and a second transceiver.

6. The system of claim 4, wherein said first transceiver and said second transceiver comprise acoustic transceivers.

7. The system of claim 4, wherein said first transceiver and said second transceiver are mounted to an upper portion of said bed box.

8. The system of claim 1, wherein said timer and said processor comprise a microprocessor which is programmable so as to be operative for determining said relative position of said downwardly extending hitch assembly with respect to a position of said hitch ball.

* * * * *